(12) United States Patent
Ponzio et al.

(10) Patent No.: US 11,498,258 B2
(45) Date of Patent: Nov. 15, 2022

(54) APPARATUS AND A METHOD FOR FORMING PRE-SHAPED INSULATING SHEETS

(71) Applicant: ATOP S.p.A., Florence (IT)

(72) Inventors: Massimo Ponzio, Siena (IT); Giovanni Manuelli, Bagno a Ripoli (IT)

(73) Assignee: ATOP S.p.A., Florence (IT)

( * ) Notice: Subject to any disclaimer, the term of this patent is extended or adjusted under 35 U.S.C. 154(b) by 263 days.

(21) Appl. No.: 16/627,494

(22) PCT Filed: Jun. 28, 2018

(86) PCT No.: PCT/EP2018/067447
§ 371 (c)(1),
(2) Date: Dec. 30, 2019

(87) PCT Pub. No.: WO2019/011662
PCT Pub. Date: Jan. 17, 2019

(65) Prior Publication Data
US 2020/0147857 A1    May 14, 2020

(30) Foreign Application Priority Data
Jul. 13, 2017 (EP) .................................. 17181241

(51) Int. Cl.
*B29C 53/06* (2006.01)
*B29B 11/06* (2006.01)
*B29L 31/00* (2006.01)

(52) U.S. Cl.
CPC .............. *B29C 53/06* (2013.01); *B29B 11/06* (2013.01); *B29C 2791/001* (2013.01); *B29C 2793/0081* (2013.01); *B29K 2995/0007* (2013.01); *B29L 2031/749* (2013.01)

(58) Field of Classification Search
None
See application file for complete search history.

(56) References Cited

U.S. PATENT DOCUMENTS

| | | | |
|---|---|---|---|
| 4,759,815 A | 7/1988 | Frey | |
| 5,344,602 A | 9/1994 | Yencho | |
| 2004/0265536 A1* | 12/2004 | Sana | B29C 70/345 428/119 |
| 2005/0262917 A1* | 12/2005 | Osumi | B21D 5/00 72/379.2 |
| 2012/0248926 A1* | 10/2012 | Guercioni | B29C 53/043 903/902 |

FOREIGN PATENT DOCUMENTS

| | | |
|---|---|---|
| GB | 1 467 635 | 3/1977 |
| WO | WO 2011/114360 | 9/2011 |

* cited by examiner

*Primary Examiner* — Timothy Kennedy
*Assistant Examiner* — Olukorede Esan
(74) *Attorney, Agent, or Firm* — Haley Guiliano LLP

(57) ABSTRACT

An apparatus for forming pre-shaped insulating sheets comprises a first bending station and a second bending station. The first bending station is used for bending a flat sheet of insulating material into a Z-shaped sheet (5). The second bending station is used for bending the Z-shaped sheet into an S-shape. The first and second bending stations comprise pairs of first (13a, 13b) and second bending operators for creating bending movements.

21 Claims, 11 Drawing Sheets

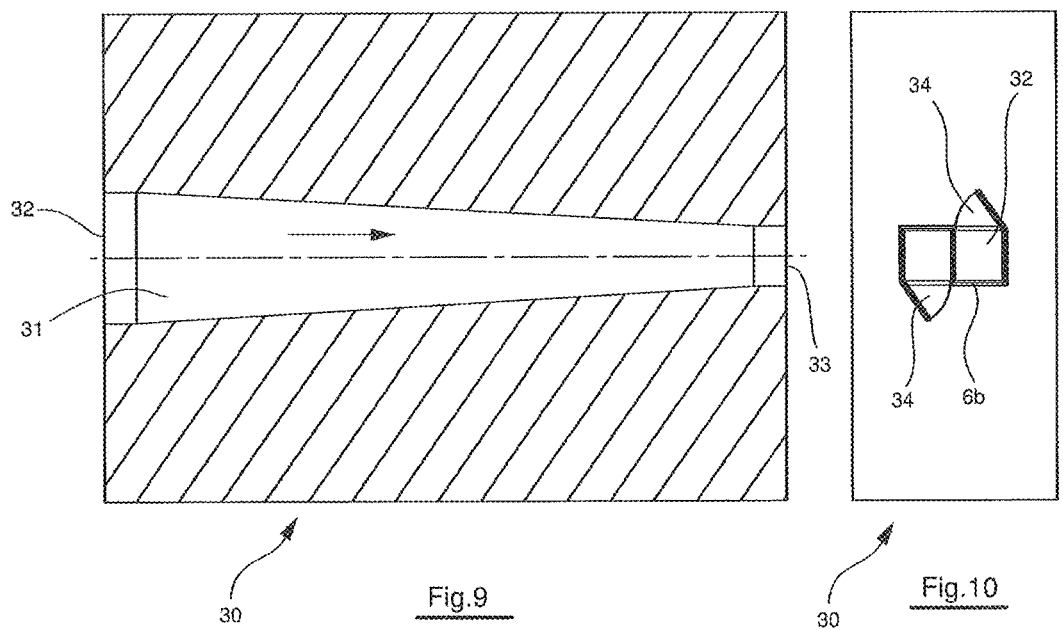

APPARATUS AND A METHOD FOR FORMING PRE-SHAPED INSULATING SHEETS

The invention relates to an apparatus and a method for forming pre-shaped insulating sheets.

Figure 4:
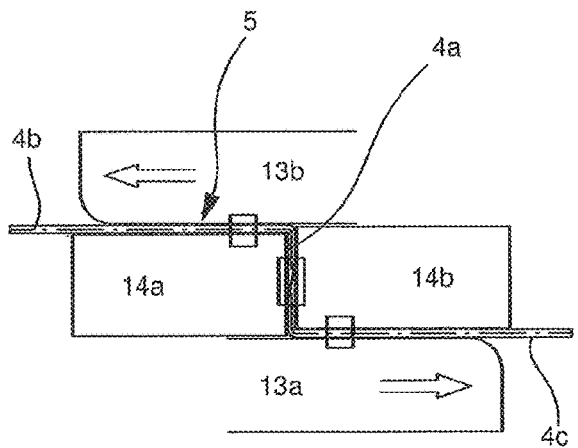
Figure 6:
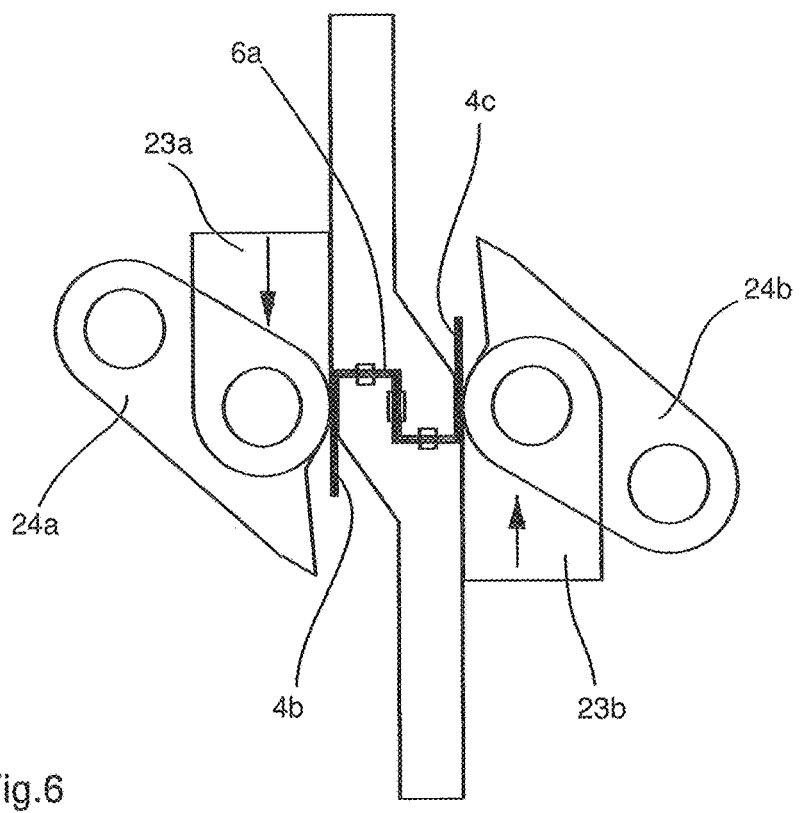

In stator assemblies insulating sheets are used for lining the walls of slots of a stator. In case of stator assemblies where more than one conductor is inserted into one slot, insulation sheets can also be used for providing an insulation between neighbouring conductors. For this purpose it is e.g. known to provide a sheet of insulating material bent into a S-shape, as it is e.g. shown in U.S. Pat. No. 8,860,278 (FIG. 6). U.S. Pat. No. 9,130,430 (FIG. 10a) shows an arrangement where in one slot of a stator four conductors are inserted and two S-shaped sheets are used for insulation. S-shaped insulators are also known from U.S. Pat. No. 5,965,965 (FIG. 4).

Before the insulator sheets can be inserted into the slots they have to be pre-shaped, typically from an initially flat continuous sheet.

WO2011/114360 A1 discloses an apparatus and method for making pre-shaped insulating sheets intended to be inserted into stator or rotor slots. According to WO2011/114360 A1 pairs of opposite rollers having a shaping profile are used for shaping a continuous strip of insulating material. The continuous strip of insulating material is passed between the rollers and thereby is shaped.

Such known apparatus and methods have, however, several disadvantages. In particular, the shape provided by the opposite rollers is predefined due to the pre-given profile of the rollers and cannot be changed or adjusted. The accuracy of sheets bent with such an apparatus is therefore limited and may even vary in the course of time.

It is therefore an object of the present invention to overcome the drawbacks of the prior art and in particular to provide an apparatus and a method which increase the accuracy of the shaping operation, in particular also in the course of time. The apparatus and method preferably should allow a fine tuning or adjustment of the shape.

According to the invention these and other objects are solved with an apparatus and a method according to the independent claims.

The apparatus for forming pre-shaped insulating sheets comprises a first and a second bending station. A flat sheet of insulating material is supplied from a continuous strip of material. The sheet material is provided with embossings which form predefined bending lines. The sheet will be formed into the desired S-shape along these bending lines, as will be explained hereinafter.

The first bending station is used for bending a flat sheet of insulating material into a Z-shaped sheet along two bending lines. The two bending lines define a center section. The second bending station is used for further bending the Z-shaped sheet into an S-shape along two or along four additional bending lines. In context with the present invention, an S-shape may refer to an open S-shape with two additional bending lines or a partially closed S-shape or a fully closed S-shape with four additional bending lines.

The first bending station comprises at least one holding mechanism for holding the flat sheet. The first holding mechanism comprises at least one first holding surface for contacting the centre section of the flat sheet. Typically, the holding mechanism comprises two opposing holding members each having a first holding surface between which the centre section of the flat sheet can be held. Typically, the holding members are translatable in a direction perpendicular to the holding surface in order to clamp and hold the centre section.

The first bending station further comprises at least one pair of first bending operators. The bending operators are used for bending tail end sections of the sheet neighbouring the centre section. The first bending operators are at least movable transversely with respect to the first holding surface. By actuating the first bending operators, the initially flat sheet which is held by the holding mechanism can be bent along two bending lines. A Z-shaped sheet may be formed thereby.

The second bending station comprises at least a second holding mechanism for holding the Z-shaped sheet. The second holding mechanism comprises a second holding surface for a part of the tail end sections of the Z-shaped sheet. Typically, the second holding mechanism has two second holding members which are arranged opposite each other and which each have two holding surfaces. A part of each of the two tail end sections of the Z-shaped sheet is held between two neighbouring holding surfaces of the two second holding members. The second holding surfaces hence define a cavity for receiving the Z-shaped sheet there-between. The second holding members can be movable towards each other in order to clamp the sheet. Alternatively, they also may be in a fixed position with respect to each other so that a sheet may be linearly inserted into the cavity without being tightly clamped.

The second bending station further comprises at least one pair of second bending operators. The second bending operators are used for bending the tail end sections of the Z-shaped sheet into an S-shape at least along second bending lines. The S-shape can be an open S-shape (bent along four lines in total, where the tail end sections run approximately parallel to the centre section of the sheet), a partially closed S-shape (bent along six lines in total, where the tail end sections first run approximately parallel to the centre section and then are inclined towards the centre section) or a fully closed S-shape (again bent along six lines in total, where the tail end sections are bent back towards the centre section such as to run approximately perpendicularly with respect to the centre section). The second bending operators are movable transversely with respect to the second holding surface.

The first and the second bending station of course may include more than one holding mechanism and more than one pair of bending operators each, e.g. for reducing manufacturing cycle time.

By providing holding mechanisms for holding the sheet and movable bending operators, the accuracy of the bending can be increased. In particular, it is also possible to fine tune or adjust the degree of bending by adjusting movements and/or forces applied to the holding members and/or operators.

According to a preferred embodiment of the invention, the second bending station comprises at least one pair of third bending operators. The third bending operators are used for bending the tail end section of the open S-shaped sheet into the partially closed S-shape along third bending lines. The third bending operators are movable in a direction parallel to the second holding surface.

By providing independent bending operators for bending the sheet along first, second and third preformed bending lines, each bending step can be separately controlled and adjusted. Alternatively it is also possible to provide bending operators having additional degrees of freedom, so that more than one bending operations can be carried out by one bending operator. In such a case the function of two or even three bending operators might be provided by the same physical operator.

While preferably the first, second and third pair of bending operators comprise operators which are arranged opposite each other, other arrangements might be conceivable.

According to a further preferred embodiment, the apparatus comprises a third bending station for bringing the tail end sections of the sheet in the partially closed S-shape into the fully closed S-shape. Since the sheets are not yet bent to the fully closed S-shape when they are removed from the second bending station, the second holding members can be easily removed from the sheet in the partially closed S-shape.

The third bending station preferably may comprise a cone channel. The cone channel is provided with an entry opening which has a cross-section adapted to receive the sheet in the partially closed S-shape. The channel has a cross-section which changes its shape from the entry opening towards an exit opening, the cross-section of which corresponds to the fully closed S-shape of the sheet. By guiding the sheet through the cone channel the tail end section will be brought into the fully closed S-shape.

The first and second bending operator typically are mounted translatably, the first operator in a direction perpendicular to the first holding surface and the second bending operator in a direction perpendicular to the second holding surface. Of course, other movements such as rotational movements also might be conceivable.

The third bending operators are preferably pivotably mounted around an axis parallel to the second holding surface. While it is preferred that the second and third bending operators may be mounted on a common carrier, other arrangements with separate carriers for the second and third bending operators might be conceivable.

According to a further preferred embodiment of the invention, the apparatus further comprises an insertion station. The insertion station is used for inserting the preformed sheets which are in the fully closed S-shape into slots of a stator. Preferably, the insertion station has a receiving unit for receiving the sheets which are in the fully closed S-shape. Such an insertion station allows an online process for directly forming and inserting the sheets into the stator.

Preferably the first and the second bending stations each have a loading and an unloading position. In the loading position, the sheet can be loaded into the respective station. Typically, the sheet will be inserted between the holding surfaces by a translational movement when the bending stations are in their respective loading position. In the unloading position the bent sheet can be removed from the respective station, typically by a translational movement of the sheets. While it is preferred that the bending stations can be movable between their respective loading and unloading positions it is also conceivable to keep the bending stations in the same position for loading and unloading and to use movable loading and unloading mechanisms for loading and unloading the sheets.

The first and the second bending stations are preferably aligned or alignable with respect to each other such that the Z-shaped sheet can be transferred from the first bending station in its unloading position to the second bending station in its loading position, in particular by a translational movement.

Preferably, the first bending station has a first pusher for transferring the sheet in its Z-shape from the first bending station into the second bending station.

If, according to a preferred embodiment as described hereinabove, the apparatus has an insertion station, the insertion station may also have a loading and an unloading position. In this case, the second bending station and the insertion station are preferably aligned or alignable such that the partly or fully S-shaped sheet is transferable from the second bending station in its unloading position to the insertion station in its loading position. In this case, the second bending station preferably has a second pusher for transferring the sheet from the second bending station to the insertion station.

Additionally or alternatively the insertion station may have a third pusher for transferring the sheet from the insertion station into a slot of a stator.

If the apparatus is provided with a third bending station with a cone channel, the cone channel is preferably alignable or aligned with the second bending station in its unloading position and with the insertion station in its loading position. Thereby, the sheet in the partially closed S-shape is transferable from the second bending station to the insertion station through the cone channel, preferably by means of the above-mentioned second pusher. Thereby, the sheet is transferred and simultaneously brought from the partially closed S-shape to the fully closed S-shape.

According to still a further preferred embodiment, the receiving unit may have a plurality of openings for receiving a plurality of formed sheets. The receiving unit can be movably arranged so that in a sequence, the plurality of openings can be filled with sequentially supplied sheets having a preformed S-shape. Thereby, two or three or even more preformed S-shaped sheets may be collected in the receiving unit and may subsequently be jointly inserted into one slot of a stator. While such a receiver is particularly advantageous in context with an apparatus described hereinabove it will be understood by a skilled person that receivers having such a plurality of openings might also be used in context with other apparatus for forming pre-shaped sheets having an S-shape.

According to still another preferred embodiment, the first bending station may be arranged on a first carousel and the second bending station may be arranged on a second carousel. In this case the first and second bending stations preferably comprise at least two first holding mechanisms, at least two pairs of first bending operators, at least two second holding mechanisms and a least two pairs of second bending operators, respectively. Preferably the insertion station may be arranged on a third carousel may comprise at least two receiving units.

The first, second and third carousel are rotatable between the respective loading and unloading positions. With such an arrangement the cycle time may be reduced and the transfer between the various stations may be facilitated.

The apparatus further may comprise a feed station for feeding insulating material from a continuous strip. The feed station comprises a cutter for cutting flat sheets of the continuously supplied sheet material. It further comprises an embossing unit for applying longitudinal embossings forming predefined bending lines. The feed station furthermore comprises a supply unit. The supply unit may either supplying the cut sheets to the first bending station or supply the continuous strip to the first bending station, where the sheets will be cut prior to the bending.

According to another aspect of the invention a method for forming pre-shaped insulating sheets is provided. Preferably the method is carried out with an apparatus as described hereinabove.

In a first step, a cut sheet of flat insulating material is provided in a first bending station. In the first bending station, a centre section of this flat sheet is contacted by a first holding surface of a first holding mechanism. Thereby, the sheet is held by the holding mechanism.

In a subsequent step, in the first bending station, tail end sections of the sheet which are neighbouring the centre section are bent along first bending lines by moving first bending operators transversely with respect to the first holding surface. Thereby, a Z-shaped sheet is formed.

In a further step, the Z-shaped sheet is transferred to a second bending station. In the second bending station the tail end sections of the Z-shaped sheet are contacted with a second holding surface of at least one second holding mechanism. Thereby, the Z-shaped sheet is held in the second bending station.

In the second bending station the Z-shaped sheet is then bent along second bending lines into an open S-shape or along second and third bending lines into a partially closed or fully closed S-shape. This bending is achieved by moving second bending operators transversely with respect to the second holding surface.

Preferably, the tail end sections of the open S-shaped sheet are bent from the open S-shape into a partially closed S-shape in a separate step by moving third bending operators in a direction parallel to the second holding surface.

According to a further preferred embodiment, in a further step, the tail end sections of the sheet in the partially closed S-shape are brought in a fully closed S-shape by means of a third bending station. Preferably the tail end sections are brought in the fully closed S-shape by translating the sheet in the partially closed S-shape through a cone channel with an entry opening having a cross-section adapted to receive the sheet in the partially closed S-shape and an exit opening which has a cross-section corresponding to the fully closed S-shape of the sheet. Thereby, the sheet can be easily brought into the final shape by a simple translational movement through the cone channel.

Preferably, in a final step, the sheets in the fully closed S-shape are inserted into slots of a stator by means of an insertion station. Such insertion preferably can be achieved by transferring the sheet in the fully closed S-shape to a receiving unit for receiving the sheets and by transferring the sheets from the receiving unit to the slot of the stator.

Figure 1A:
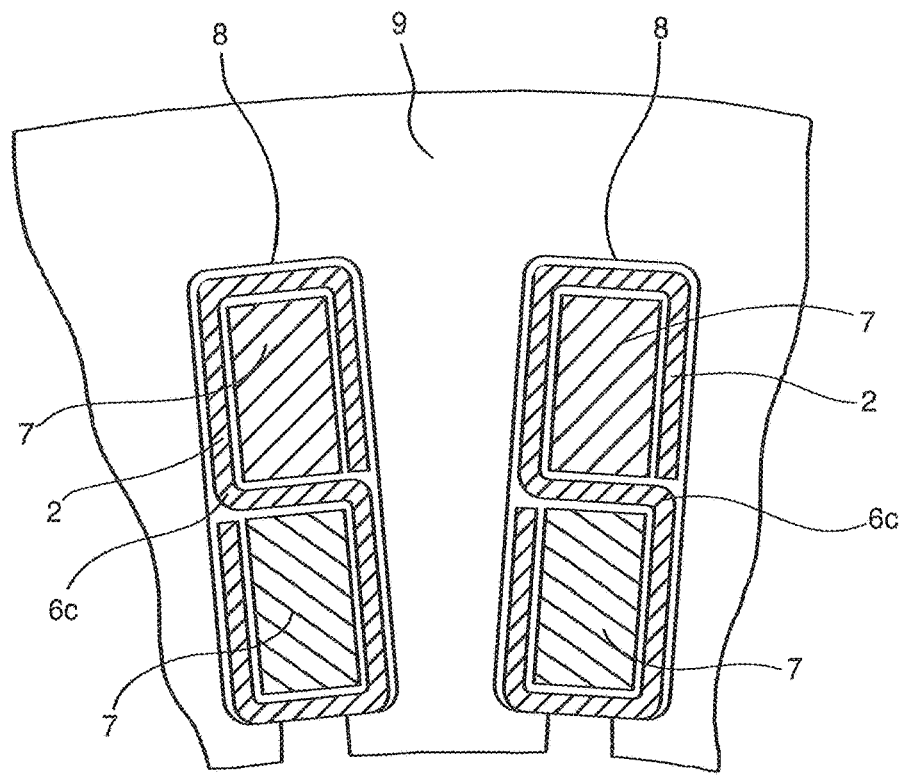

The invention will now be described with reference to a preferred embodiment and the drawings, which show:

FIG. 1a A schematic view of a stator with an insulating sheet

Figure 1B:
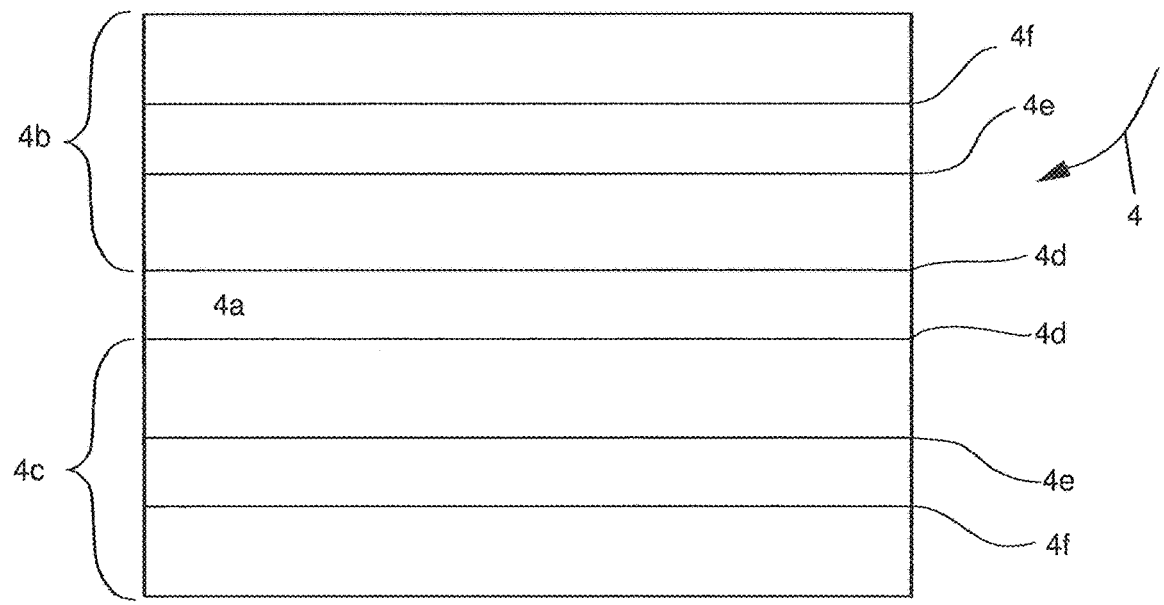

FIG. 1b A schematic plan view of a flat insulator sheet

Figure 2:
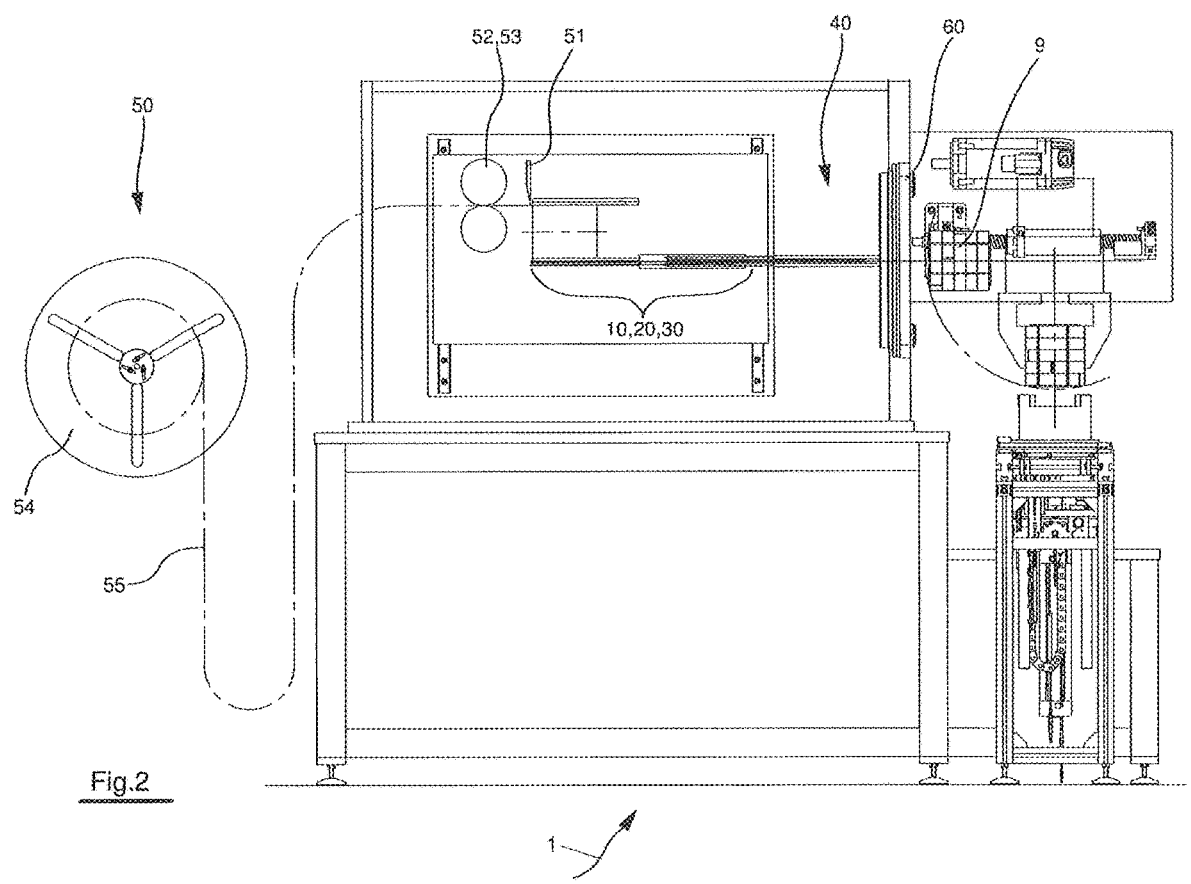

FIG. 2 A schematic side view of an apparatus according to the invention

Figure 3:
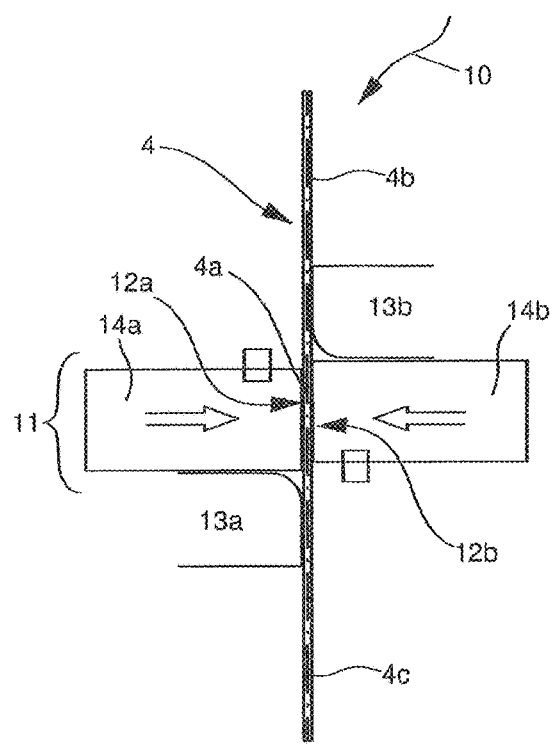
Figure 5:
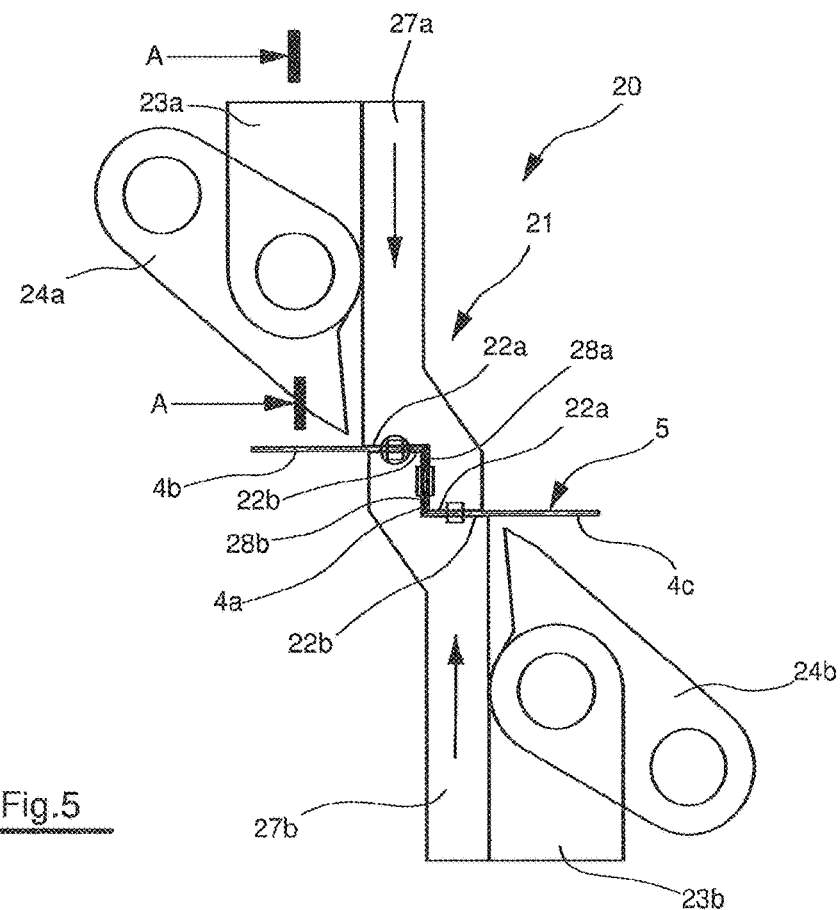
Figure 7:
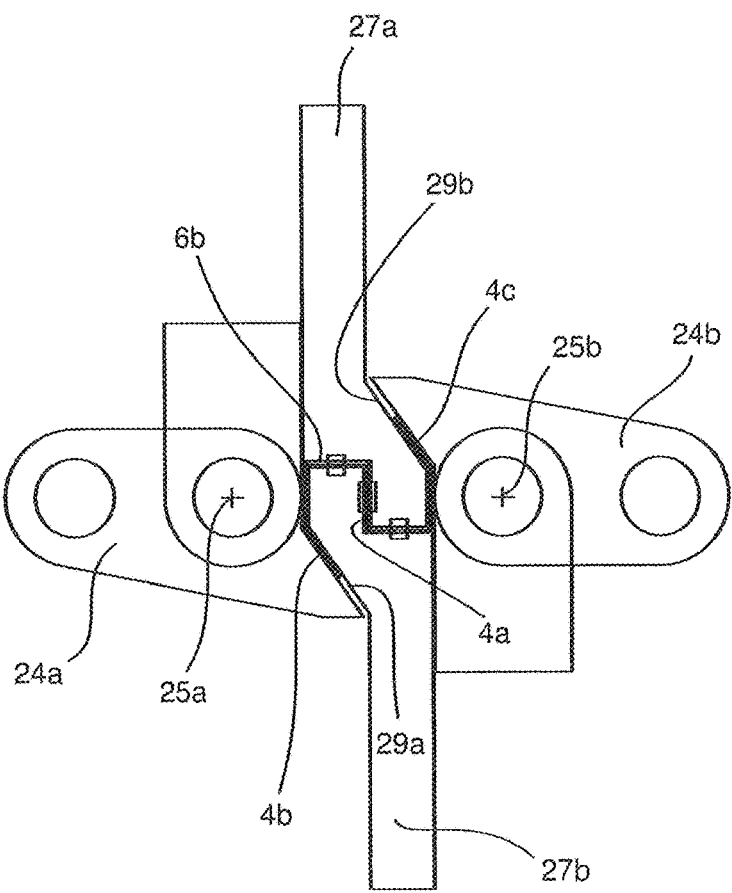
Figure 8:
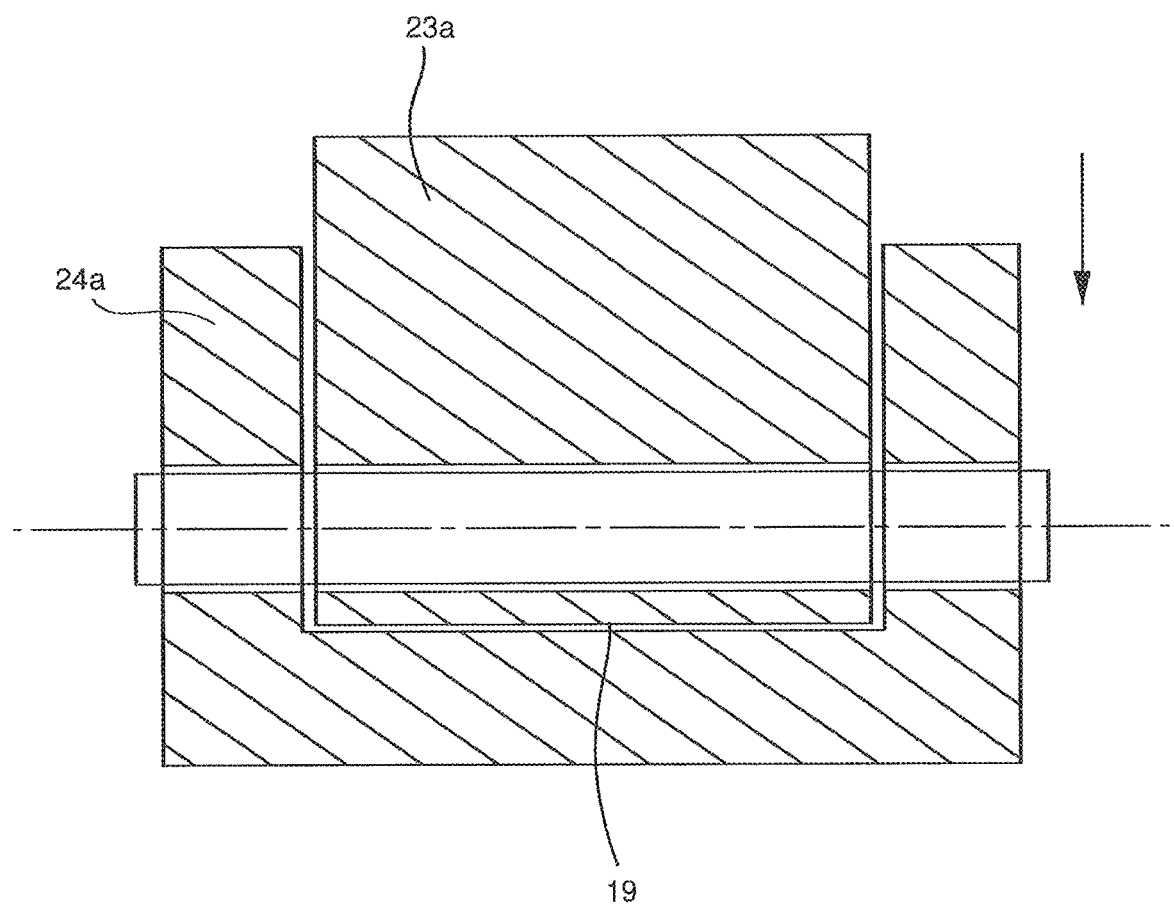

FIG. 3 A schematic side view of the first bending station with an insulating material held in an unbent shape FIG. 4 A schematic side view of the first bending station with the insulating material held in a bent Z-shape FIG. 5 A schematic side view of the second bending station with the insulating material held in a bent Z-shape FIG. 6 A schematic side view of the second bending station with the insulating material held in a bent open S-shape FIG. 7 A schematic side view of the second bending station with the insulating material held in a bent partially closed S-shape FIG. 8 A schematic cross-sectional view of the bending operators of second bending station along the plane A-A shown in FIG. 5

FIG. 9 A schematic cross section along the longitudinal axis of a forming cone between the second and third bending station FIG. 10 A front view to the entry opening of the forming cone according to FIG. 9

Figures 11, 12:
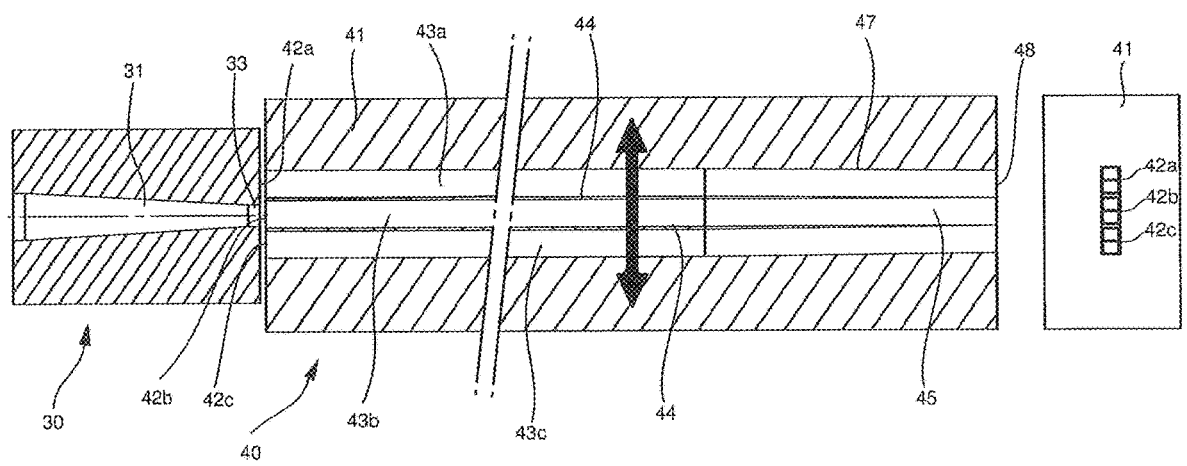

FIG. 11 A schematic cross section along the longitudinal axis of the forming cone of FIG. 9 and of a receiving section FIG. 12 A front view of the exit opening of the receiving section according to FIG. 11

Figure 13:
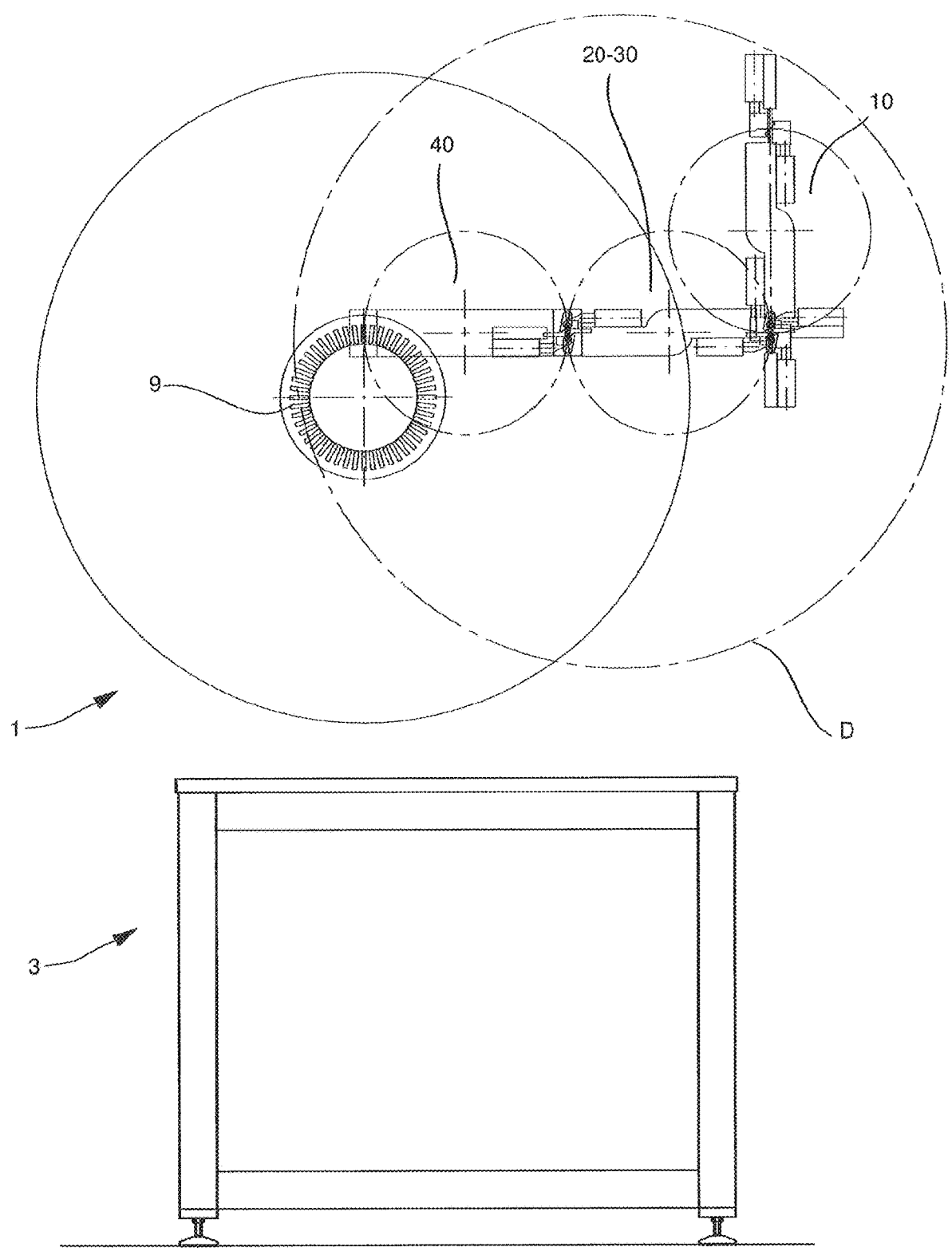

FIG. 13 A schematic front view of the apparatus according to FIG. 2

Figure 14:
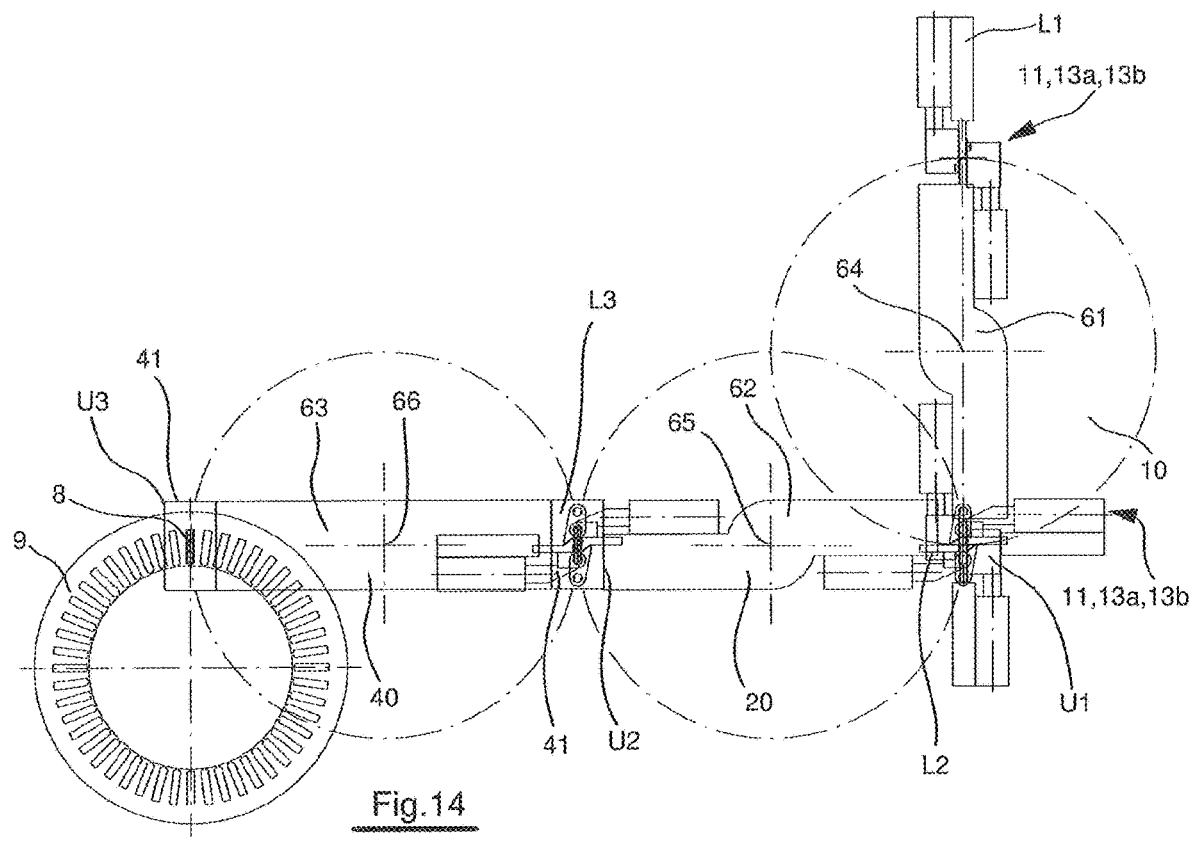

FIG. 14 An enlarged view of part D of FIG. 13

Figure 15:
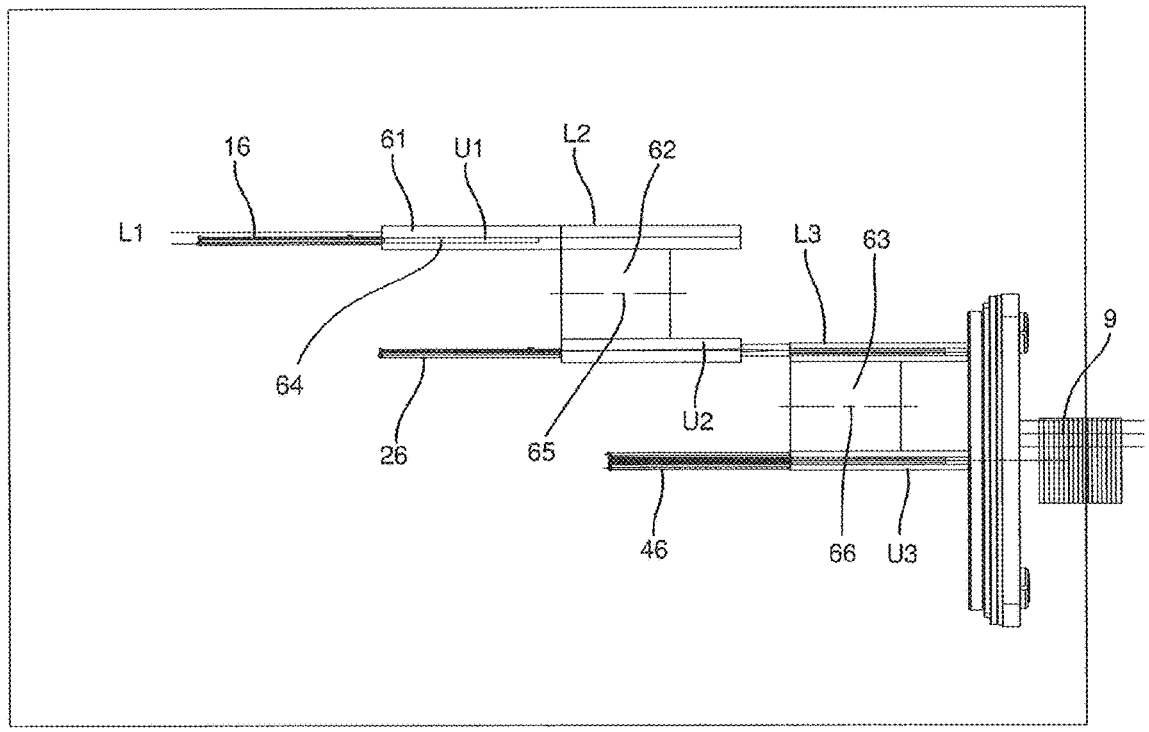

FIG. 15 A schematic top view of the carousels of the apparatus of FIG. 14

Figure 16:
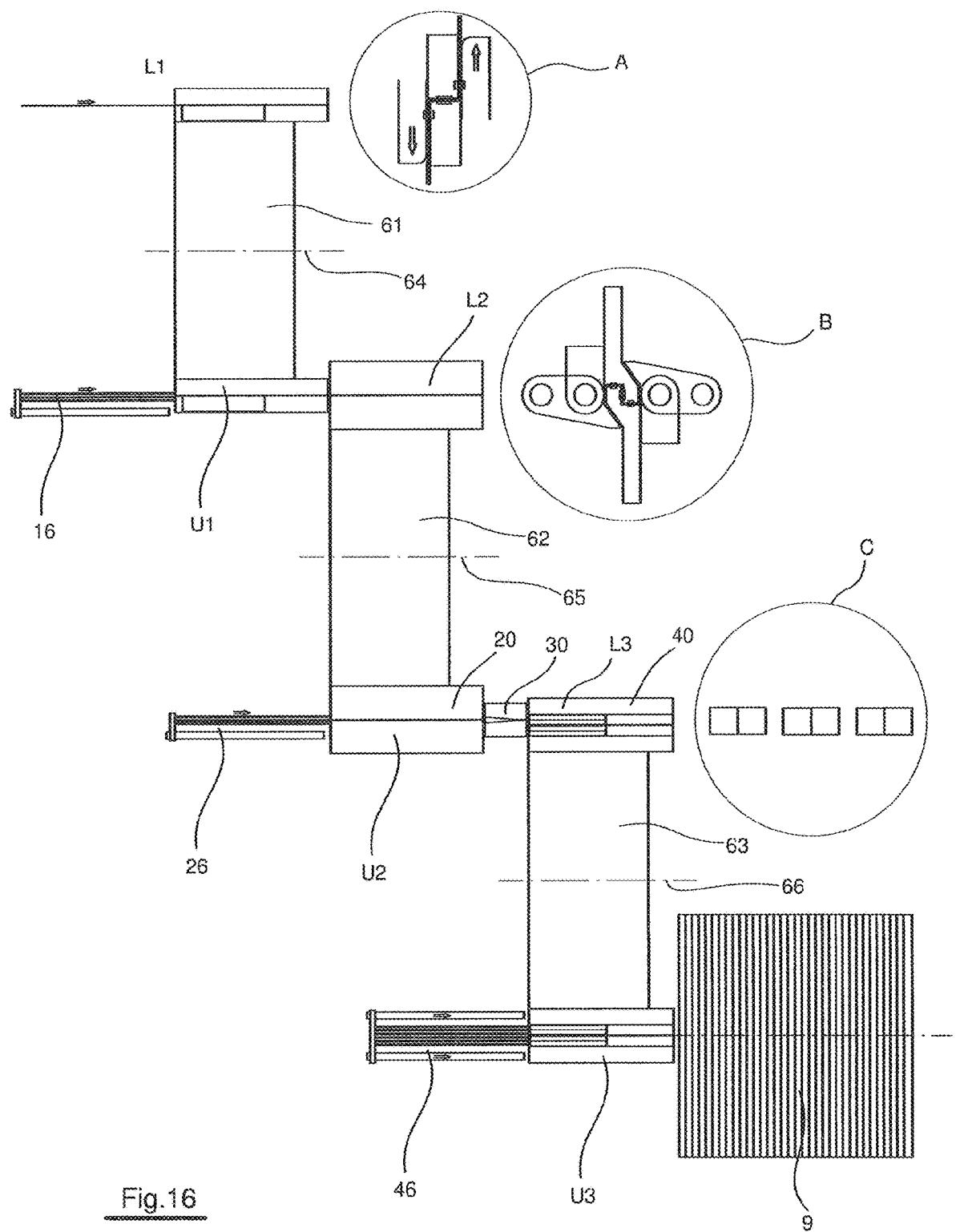
Figure 17:
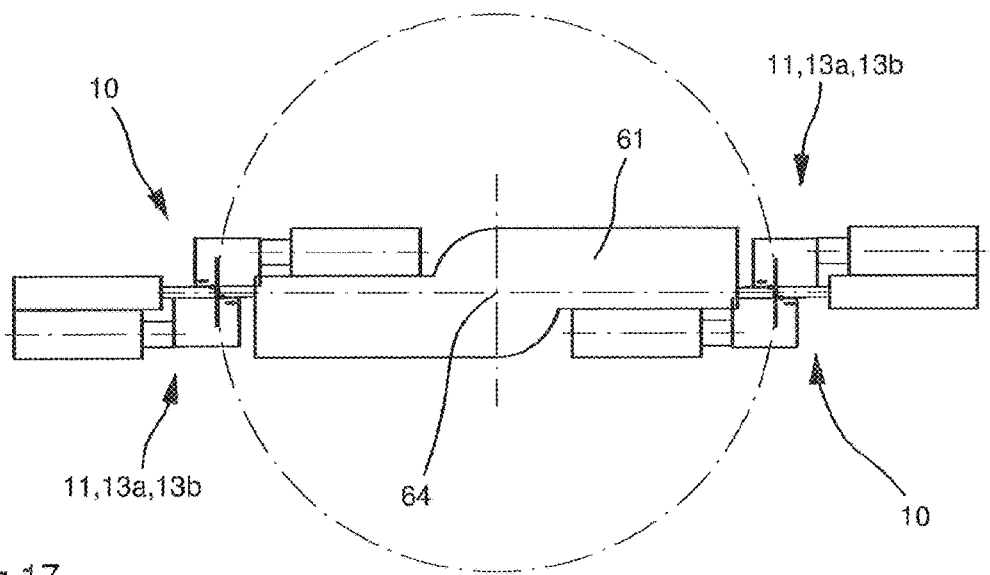
Figure 18:
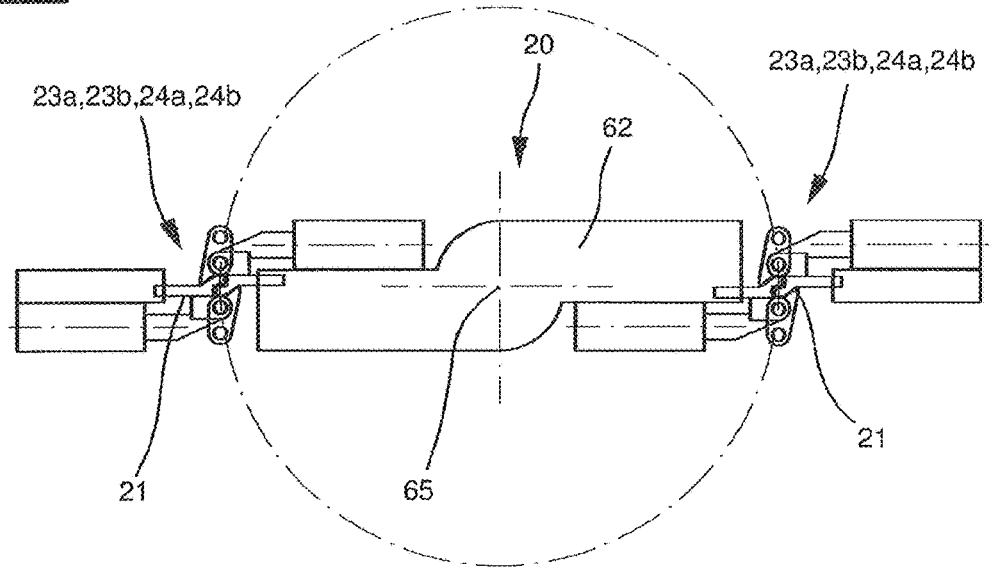
Figure 19:
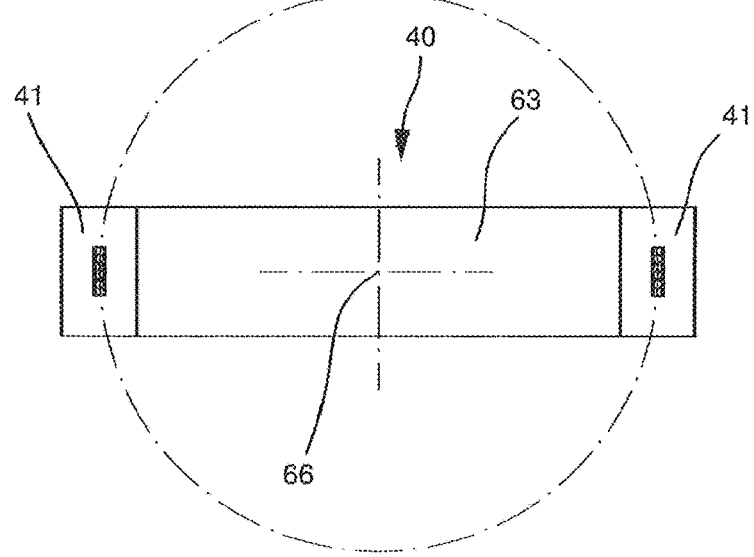

FIG. 16 An enlarged top view similar to FIG. 15 with the first carousel turned by 90° for illustrative purposes FIG. 17 A schematic view of a first carousel with a first bending station FIG. 18 A schematic view of a second carousel with a second bending station FIG. 19 A schematic view of a third carousel with a receiving section.

FIG. 1a schematically shows a stator 9 having slots 8. Conductors 7 are arranged in the slots 8. A pre-shaped insulating sheet 2 having a fully closed S-shape 6c is arranged between the inner surface of the slots 8 and the conductors 7. The sheet 2 is shaped in a fully closed S-form such that it is also arranged between two neighbouring conductors 7 which are arranged in the same slot 8. The sheet is made from an insulation material typically used for lining stator slots and has typically a thickness of 0.2 to 0.3 mm.

FIG. 1b schematically shows plan view of a flat sheet 4. The flat sheet 4 has a center section 4a delimited by two preformed bending lines 4d provided by embossings. The bending lines 4d define tail end sections 4b, 4c. The tail send sections 4b, 4c each comprise two additional bending lines 4e and 4f allowing to bend the sheet 4 into the fully closed S-shape as shown in FIG. 1a.

FIG. 2 schematically shows an apparatus 1 for forming pre-shaped insulating sheets and for inserting the pre-shaped sheets into a stator. The apparatus 1 comprises first, second and third bending stations 10, 20, 30 which are only schematically shown in FIG. 2.

The apparatus 1 comprises a feed station 50. In the feed station 50 a continuous strip 55 of insulating material is supplied from a reel 54. A schematically shown embossing unit 52 with rollers provides longitudinal embossings to the strip 55 in order to define bending lines. A schematically shown cutter 51 cuts separate sheets of flat insulation material from the continuously fed strip 55. The rollers of the embossing unit 52 also form a supply unit 53 which supplies the strip 55 to the first bending station 10 where sheets can be cut with the cutter 51.

The sheets which are bent by the bending stations 10, 20, 30 (as will be explained in detail hereinafter) are transferred from the third bending station 30 to a stator 9 which will be held in a stator holding unit 60. Insertion of the strip into slots of the stator 9 is made by a schematically shown insertion station 40.

FIG. 3 schematically shows the first bending station 10. In the first bending station 10, a flat sheet 4 of insulating material is provided. The flat sheet 4 comprises the centre section 4a and two tail end sections 4b, 4c as explained in FIG. 1b. The first bending station 10 comprises a first holding mechanism 11. The first holding mechanism 11 comprises two holding members 14a, 14b which are arranged opposite each other and which are translateably mounted with respect to each other. The holding members 14a, 14b comprise respective holding surfaces 12a, 12b for contacting and holding the centre section 4a of the flat sheet 4. By moving the holding members 14a, 14b towards each other in the direction of the arrows shown in FIG. 3, the sheet 4 can be clamped. The first bending station 10 further comprises a pair of first bending operators 13a, 13b. The bending operators 13a, 13b are arranged on opposite sides of the sheet 4, but are not directly opposing each other, so that by translating the bending operators 13a, 13b in a direction towards the flat sheet 4 the flat sheet 4 is brought into a Z-shaped sheet 5 as it is shown in greater detail in FIG. 4.

In FIG. 4, the bending operators 13a, 13b have been longitudinally displaced in the direction indicated by the arrows. The centre section 4a of the sheet 4 is still held between the holding members 14a, 14b whereas the tail end sections 4b, 4c have been bent by the bending operators 13a, 13b. Bending is made around the predefined bending lines 4d formed by embossings in the initially flat strip (see FIG. 1b).

Once the sheet has been brought into the Z-shaped sheet 5 it is transferred into the second bending station 20 which is schematically shown in FIG. 5. The second bending station 20 comprises a second holding mechanism 21 with two holding members 27a, 27b. Each of these holding members 27a, 27b has two second holding surfaces 22a and 22b, respectively. The holding surfaces 22a, 22b will contact parts of the tail end sections 4b, 4c neighbouring the centre section 4a and will thereby hold the sheet in the Z-shape 5. In the specific embodiment shown the holding members 27a, 27b are translatable towards each other along the arrows shown in FIG. 5 and thereby can hold or clamp the Z-shaped sheet 5. The holding members 27a, 27b have a stepped profile so that the holding surfaces 22a are arranged axially displaced with respect to each other and the holding surfaces 22b are arranged axially displaced with respect to each other. A connecting surface 28a is connecting the holding surfaces 22a of the first holding member 27a. The connecting surface 28a is running substantially perpendicular to the holding surface 22a. In a similar manner, a connecting surface 28b connects the holding surfaces 22b of the second holding member 27b. The centre section 4a of the Z-shaped sheet 5 is arranged between the two connecting surfaces 28a, 28b.

The second bending station further comprises a pair of second bending operators 23a, 23b and a pair of third bending operators 24a, 24b, the operation of which will be explained in more detail with reference to FIGS. 6 to 8.

As shown in FIG. 6, in a first step, the second bending operators 23a, 23b are moved towards each other in the direction indicated by the arrow in FIG. 6. Thereby, the tail end sections 4b, 4c, of the initially Z-shaped sheet 5 are bent along the predefined bending lines 4e (see FIG. 1b) and abut against a straight portion of an outer abutment surface 29a, 29b of the holding members 27a, 27b. The sheet is transformed into an open S-shape 6a as indicated in FIG. 6. In the open S-position as shown in FIG. 6, the tail end sections 4b, 4c run parallel to the centre section. The second bending operators 23a, 23b and the third bending operators 24a, 24b are mounted on a displaceable carrier (not shown in detail) and are therefore jointly translated in this step. However, during this translation step, the third bending operators 24a, 24b are still in an inactive position and do not contribute to the bending operation.

The third bending operators 24a, 24b are pivotably around respective pivot axes 25a, 25b, as it is shown in FIG. 7. By pivoting the third bending operators 24a, 24b around the pivot axes 25a, 25b the tail end sections 4b, 4c of the sheet in the open S-shape 6a as shown in FIG. 6 are bent along the predefined bending lines 4f (see FIG. 1b) and are brought into a partially closed S-shape 6b as shown in FIG. 7. In the partially closed S-shape 6b, the tail end sections are inclined and directed towards the centre section 4a.

As shown in FIG. 7, the holding members 27a, 27b also comprise inclined parts of the outer surfaces 29a, 29b forming an abutment for defining the partially closed S-shape 6b.

The respective holding members and operators shown in FIGS. 3 to 7 are actuatable with means known to the person skilled in the art, typically by controlled pressure cylinders or controlled servo motors.

FIG. 8 is a schematic cross sectional view (along the plane A-A shown in FIG. 5) of one second bending operator 23a and one third bending operator 24a of the second bending station. The second and the third bending operator 23a, 24a are mounted on a joint carrier and are translatable in the direction of the arrow shown in FIG. 8. When the round edge surface 19 of the second bending operator 24a contacts the tail end 4b (see movement from FIG. 5 to FIG. 6), it will bend the tail end 4b along a predefined bending embossment.

FIG. 9 schematically shows a cross-section through a third bending station 30. The third bending station 30 is basically formed as a block having a cone channel 31 formed therein. The cone channel 31 has an entry opening 32 and an exit opening 33.

FIG. 10 shows a front view to the side of the bending station 30 having the entry opening 32. As it is shown in FIG. 10, the entry opening 32 is sized and shaped such as to receive the sheet in the partially closed S-shape 6b. The cone channel 31 has cone surfaces 34 which continuously taper towards the shape of the exit opening 33 which corresponds to a fully closed S-shape 6c of the sheet, corresponding to the shape shown in FIG. 1a. By passing the sheet axially through the cone channel 31 in the direction of the arrow shown in FIG. 9, the sheet will be transformed from the partially closed S-shape 6b to the fully closed S-shape 6c.

FIG. 11 shows a schematic cross-section of the third bending station 30 in combination with an insertion station 40. The insertion station 40 has a receiving unit 41. The receiving unit 41 has three channels 43a, 43b, 43c having respective receiving openings 42a, 42b, 42c. The receiving unit 41 is laterally displaceable (see arrow in FIG. 11) with respect to the cone channel 31. Therewith, the receiving openings 42a, 42b, 42c can be aligned with the exit opening 33 of the cone channel 31.

FIG. 12 shows a side view of the receiving unit 41 with the receiving openings 42a, 42b, 42c. When a sheet is translated along the cone channel 31 it will exit the exit opening 33 and will be transferred into the aligned receiving opening 42b. Once a sheet has been transferred into the receiving opening 42b, the receiving unit 41 will be laterally translated such as to have another receiving opening (e.g. receiving opening 42a) aligned with the exit opening 33 so that another sheet can be received by the receiving unit 41.

The receiving channels 43a, 43b, 43c are separated from each other by walls 44. The walls 44 are only present in about ⅔ of the length of the receiving unit 41 such that the channels 43a, 43b, 43c merge together to form one joint channel 45 in the receiving unit 41 (shown on the right hand side in FIG. 11). The walls 47 slightly taper such as to slightly converge in the longitudinal direction in FIG. 11 (from left to right). By pushing three sheets axially through the channels 43a, 43b, 43c, the sheets will be pushed towards each other in the joint channel 45. The three sheets can then be jointly transferred from an exit opening 48 of the receiving unit 41 to one slot of a stator. Of course, less than three or more than three channels can be used in case less or more sheets should be inserted into one slot.

FIG. 13 shows a front view of the apparatus 1 shown in FIG. 2. In FIG. 13, only the first and second bending stations 10, 20, and the insertion station 40 and a schematic stator 9 are shown. Each of the bending stations 10, 20, and the insertion station 40 are mounted on a carousel (see also in more detail and FIGS. 14 to 19). The apparatus 1 further comprises a machine table 3 which is not described in more detail and which is used for supporting the various components.

FIG. 14 shows a more detailed view of the bending stations and insertion stations shown in the area D of FIG. 13.

The first bending station 10 is arranged on a first carousel 61. The first bending station 10 has two first holding mechanisms 11 and two pairs of first bending operators 13a, 13b. The first carousel 61 is pivotably mounted around a first axis 64.

A second bending station 20 is arranged on a second carousel 62 which is pivotably mounted around an axis 65. The second bending station 20 has two second holding mechanisms 21 and two pairs of second bending operators 23a, 23b and two pairs of third bending operators 24a, 24b (not indicated in FIG. 14).

A insertion station 40 with two receiving units 41 is mounted on a third carousel 63 which is pivotably arranged around an axis 66. The carousels 61, 62, 63 are each rotatable between respective loading and unloading positions L1, L2, L3 and U1, U2, U3.

In process, an initially flat sheet (see FIGS. 1b and 3) is inserted into a holding mechanism 11 of the first bending station 10 in the loading position L1 and is bent therein as explained hereinabove. At the same time, a sheet which had been bent to its Z-shape 5 in a previous sequence in the other holding mechanism 11 of the first bending station 10 is now in the unloading position U1 and can be linearly transferred to the holding mechanism 21 of the second bending station 20 which is in the loading position L2 and can be bent to the partially closed S-shape 6b as explained hereinabove. At the same time a sheet which had been brought to the partially closed S-shape 6b in a previous step in the other holding mechanism 11 of the second bending station 20 is now in the unloading position U2 and can be transferred by linear translation into a receiving unit 41 of the insertion station 40 which is in the loading position L3 on the third carousel 63.

Still in parallel, a sheet in the fully closed S-shape 6c included in the receiving unit 41 in the unloading position U3 can be transferred into one of the slots 8 of the stator 9.

For linearly transferring the sheets as described above from one to another carousel, first, second and third pushers 16, 26 and 46 are provided as shown in the top view of FIG. 15. While pusher 16 and 26 are single pushers, third pusher 46 may be a multiple pusher such as to allow pushing more than one sheet received in a plurality of receiving channels of the receiving unit 41 in parallel (see also FIG. 11 for the plurality of receiving channels). FIG. 15 also shows the respective axial alignment between the various carousels 61, 62, and 63 in their unloading position U1 and loading position L2, their unloading U2 and loading position L3 and their unloading position U3 and the slots of the stator 9, respectively.

FIG. 16 shows a more detailed view of the three carousels 61, 62, 63. It is to be noted that for illustrative purposes the first carousel 61 is shown rotated by 90°, the correct orientation being illustrated in FIG. 15. FIG. 16 also shows first, second and third pushers 16, 26, 46.

Between the unloading position U2 of the second bending station 20 and the loading position L3 of the insertion station 40, the third bending station 30 is arranged in an aligned manner so that, by actuating the pusher 26, the sheet can be transferred in a linear movement from the second bending station 20 to the insertion station 40 through the third bending station 30. FIG. 16 further shows schematic front views of the respective components in the details A, B, and C.

FIGS. 17, 18 and 19 show more detailed views of the first, second and third carousel 61, 62 and 63. The first carousel 61 carries two holding mechanisms 11 and two pairs of first bending operators 13a, 13b. The second carousel 62 carries two holding mechanisms 21 and two pairs of second and of third bending operators 23a, 23b and 24a, 24b. The third carousel 63 carries two receiving units 41.

The invention claimed is:

1. An apparatus for forming pre-shaped insulating sheets, the apparatus comprising:
 a first bending station for bending a flat sheet of insulating material into a Z-shaped sheet;
 a second bending station for further bending the Z-shaped sheet into an S-shape;
 wherein the first bending station comprises at least one first holding mechanism for holding the flat sheet, the first holding mechanism comprising:
  a first holding surface for contacting a center section of the flat sheet; and
  at least one pair of first bending operators for bending tail end sections of the sheet neighboring the center section, the first bending operators being movable transversely in opposite directions with respect to the first holding surface such that each of the tail end sections of the sheet are bent away from each other around a first predefined bending line and a second predefined bending line, thereby forming the Z-shaped sheet, wherein the first predefined bending line is displaced on a surface of the flat sheet from the second predefined bending line;
 wherein the second bending station comprises at least one second holding mechanism for holding the Z-shaped sheet, the second holding mechanism comprising:
  a second holding surface for contacting a tail section of the Z-shaped sheet; and
  at least one pair of second bending operators for bending the tail end sections of the Z-shaped sheet into one of an open S-shape or partially closed S-shape or fully closed S-shape, the second bending operators being at least movable transversely with respect to the second holding surface.

2. The apparatus according to claim 1, wherein the second bending station comprises at least one pair of third bending operators for bending the tail end sections of the open S-shaped sheet into a partially closed S-shape, the third bending operators being movable in a direction parallel to the second holding surface.

3. The apparatus according to claim 1, wherein the apparatus comprises a third bending station for bringing the tail end sections of the partially closed S-shaped sheet into a fully closed S-shape.

4. The apparatus according to claim 3, wherein the third bending station comprises a cone channel with an entry opening having a cross section adapted to receive the partially closed S-shaped sheet and an exit opening having a cross section corresponding to the fully closed S-shape of the sheet.

5. The apparatus according to claim 1, wherein the first bending operators are translatably mounted in a direction perpendicular to the first holding surface.

6. The apparatus according to claim 1, wherein the second bending operators are translatably mounted in a direction perpendicular to the second holding surface.

7. The apparatus according to claim 1, wherein the third bending operators are pivotably mounted around an axis parallel to the second holding surface.

8. The apparatus according to claim 1, the apparatus further comprising an insertion station for inserting preformed sheets having the fully closed S-shape into slots of a stator.

9. The apparatus according to claim 1, wherein:
the first bending station has a loading position and an unloading position;
the second bending station has a loading position and an unloading position, the first and the second bending station being configured for alignment such that the Z-shaped sheet is transferable from the first bending station in its unloading position to the second bending station in its loading position; and
the first bending station has a first pusher for transferring the sheet in the Z-shape from the first bending station to the second bending station.

10. The apparatus according to claim 8, wherein:
the insertion station has a loading position and an unloading position;
the second bending station and the insertion station are configured for alignment such that the S-shaped sheet is transferable from the second bending station in its unloading position to the insertion station in its loading position;
the second bending station has a second pusher for transferring the sheet from the second bending station to the insertion station; and
the insertion station has a third pusher for transferring the sheet from the insertion station into a slot of a stator.

11. The apparatus according to claim 4, wherein the cone channel is configured for alignment with the second bending station in an unloading position of the second bending station and with an insertion station in a loading position of the insertion station, such that the sheet in the partially closed S-shape is transferable from the second bending station to the insertion station through the cone channel by means of said second pusher.

12. The apparatus according to claim 8, with an insertion station for inserting preformed sheets in a fully closed S-shape into slots of a stator, the insertion station having at least one receiving unit for receiving the sheets in the fully closed S-shape, the receiving unit having a plurality of openings for receiving a plurality of formed sheets.

13. The apparatus according to claim 1, wherein:
the first bending station is arranged on a first carousel and comprises at least two first holding mechanisms and at least two pairs of first bending operators;
the second bending station is arranged on a second carousel and comprises at least two second holding mechanisms and at least two pairs of second bending operators;
the insertion station is arranged on a third carousel and comprises at least two receiving units; and
the first carousel, second carousel, and third carousel are each rotatable between the respective loading positions and unloading positions.

14. The apparatus according to claim 1, the apparatus further comprising:
a feed station, the feed station comprising:
a cutter for cutting flat sheets of insulating material from a continuously supplied sheet of insulating material;
an embossing unit for applying longitudinal embossings into the insulating material; and
a supply unit configured to:
supply the cut sheets to the first bending station; and
supply the continuous supplied sheet of insulating material to a first forming station prior to cutting.

15. A method for forming pre-shaped insulating sheets:
providing a cut sheet of flat insulating material in a first bending station;
in said first bending station, contacting a center section of the flat sheet with a first holding surface of a first holding mechanism, thereby holding the sheet;
in said first bending station, bending tail end sections of the sheet neighboring the center section by moving first bending operators in opposite directions transversely with respect to the first holding surface such that each of the tail end sections of the sheet are bent away from each other around a first predefined bending line and a second predefined bending line, thereby forming a Z-shaped sheet, wherein the first predefined bending line is displaced on a surface of the flat sheet from the second predefined bending line;
transferring the Z-shaped sheet into a second bending station;
in said second bending station, contacting the tail section of the Z-shaped sheet with a second holding surface of a second holding mechanism, thereby holding the Z-shaped sheet; and
in said second bending station, bending the Z-shaped sheet into one of an open S-shape, a partially closed S-shape or a fully closed S-shape by moving bending operators transversely with respect to the second holding surface.

16. The method according to claim 15, further comprising bending the tail end sections of the open S-shaped sheet into a partially closed S-shape by moving third bending operators in a direction parallel to the second holding surface.

17. The method according to claim 15, further comprising bending the tail end sections of the partially closed S-shaped sheet into a fully closed S-shape by means of a third bending station.

18. The method according to claim 15, further comprising inserting at least one sheet in the fully closed S-shape into a slot of a stator by means of an insertion station.

19. The method according to claim 18, wherein inserting at least one sheet in the fully closed S-shape into a slot of the stator by means of an insertion station comprises:
transferring the sheet in the fully closed shape to a receiving unit for receiving the sheet; and
transferring the at least one sheet from the receiving unit into the slot of the stator.

20. The method according to claim 17, wherein bending the tail end sections of the partially closed S-shaped sheet into a fully closed S-shape by means of a third bending station comprises translating the partially S-shaped sheet through a cone channel with an entry opening having a cross section adapted to receive the partially S-shaped sheet and an exit opening having a cross section corresponding to the fully closed S-shape of the sheet.

21. The apparatus according to claim 8, wherein the insertion station comprises at least one receiving unit for receiving the sheets in the fully closed S-shape.

* * * * *